(No Model.)  3 Sheets—Sheet 1.
T. R. TIMBY.
APPARATUS FOR AGING WINES, SPIRITS, OR OTHER LIQUORS.
No. 486,000. Patented Nov. 8, 1892.
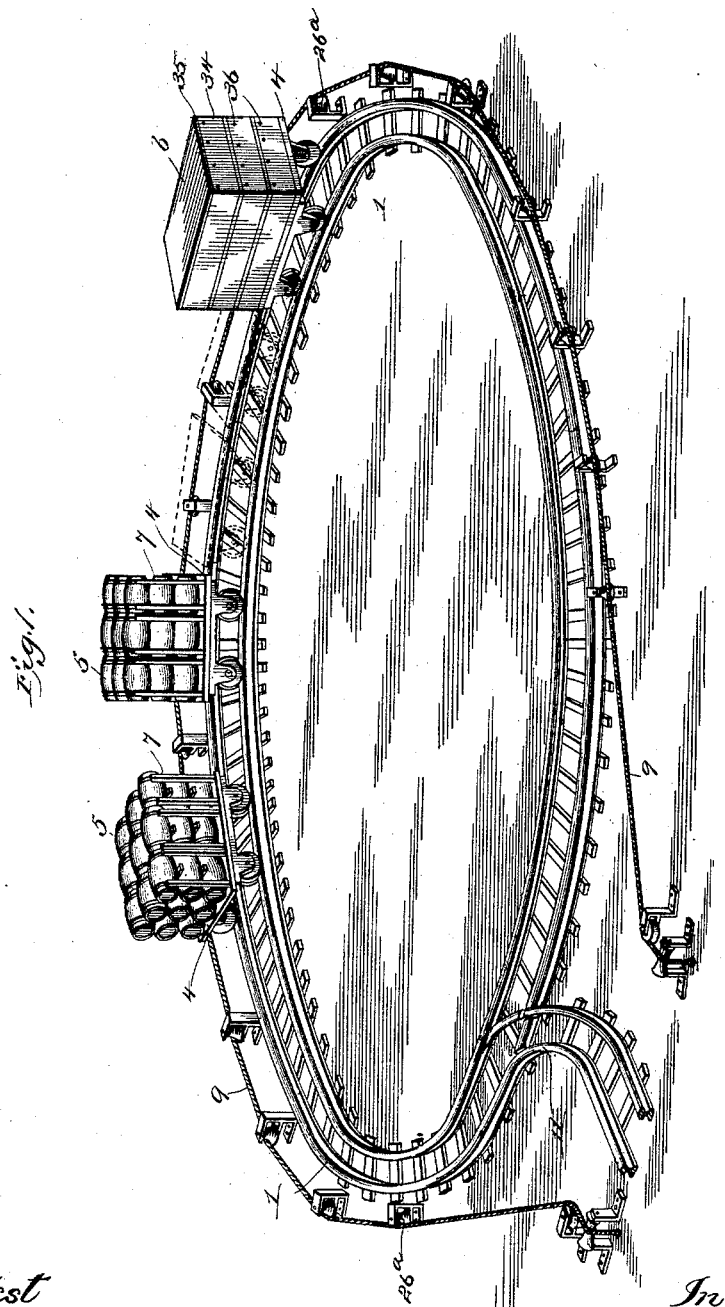

(No Model.) 3 Sheets—Sheet 2.
T. R. TIMBY.
APPARATUS FOR AGING WINES, SPIRITS, OR OTHER LIQUORS.
No. 486,000. Patented Nov. 8, 1892.
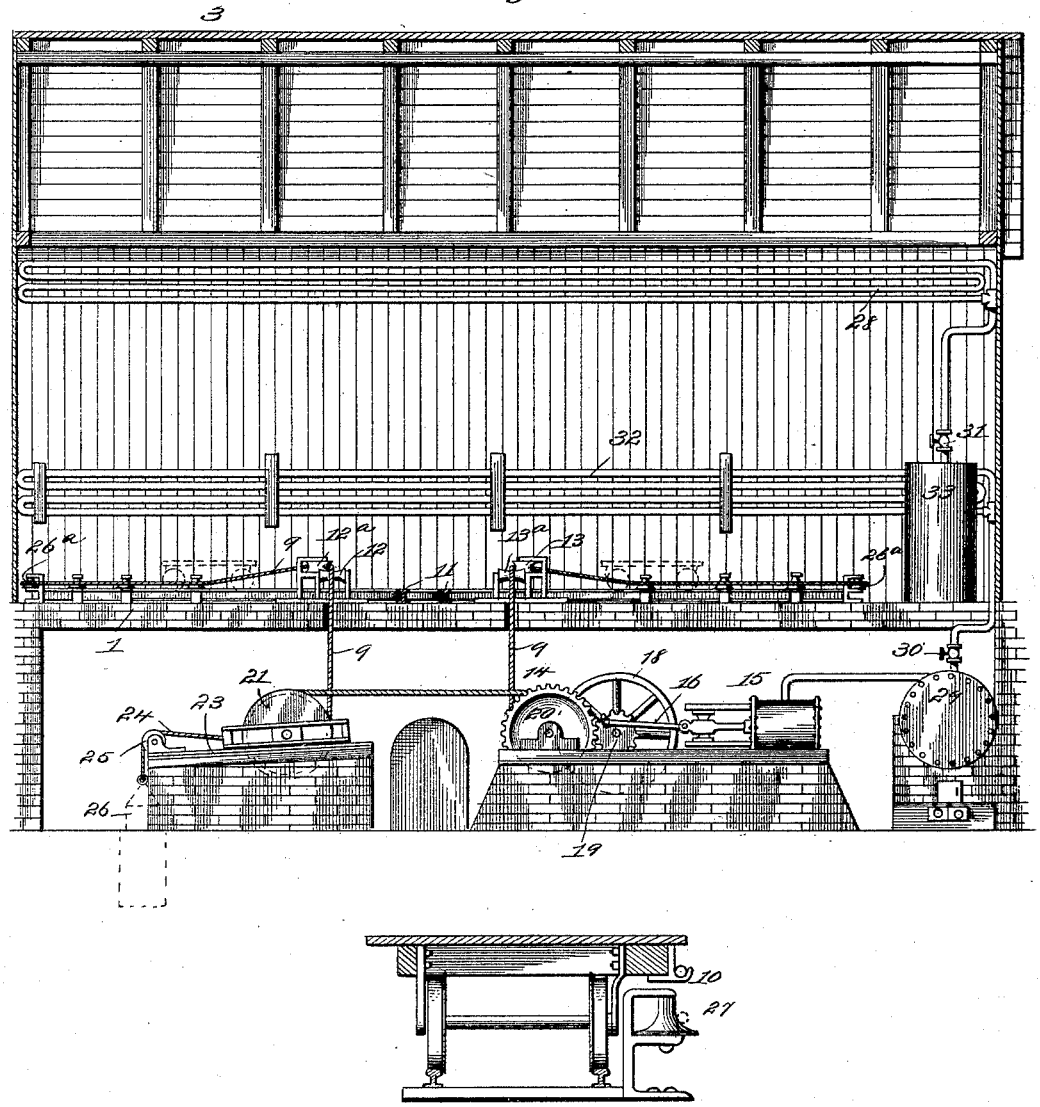
Fig. II.
Witnesses
Harry B. Rohrer
George E. Cruse
Inventor
Theodore R. Timby.
By Knight Bros.
Attorneys (No Model.) 3 Sheets—Sheet 3.
T. R. TIMBY.
APPARATUS FOR AGING WINES, SPIRITS, OR OTHER LIQUORS.
No. 486,000. Patented Nov. 8, 1892.
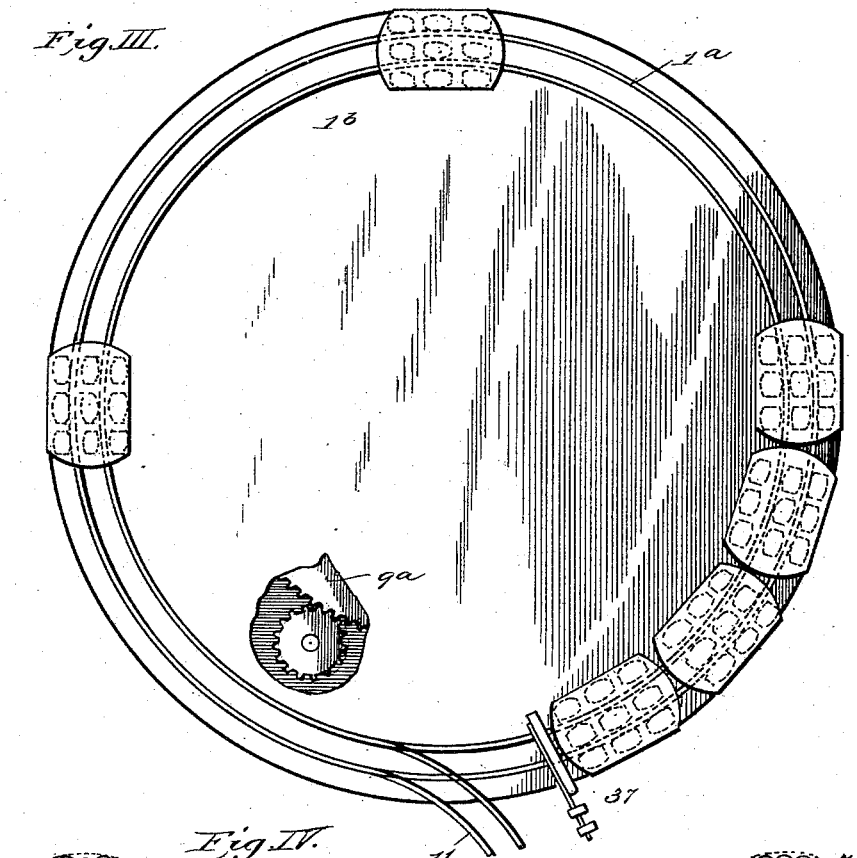
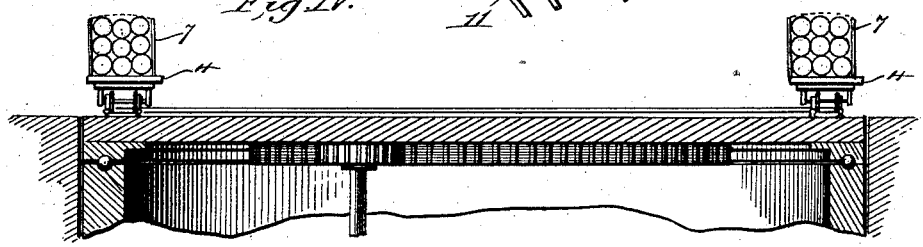

UNITED STATES PATENT OFFICE.

THEODORE R. TIMBY, OF WASHINGTON, DISTRICT OF COLUMBIA.

APPARATUS FOR AGING WINES, SPIRITS, OR OTHER LIQUORS.

SPECIFICATION forming part of Letters Patent No. 486,000, dated November 8, 1892.

Application filed August 26, 1892. Serial No. 444,158. (No model.)

*To all whom it may concern:*

Be it known that I, THEODORE R. TIMBY, a citizen of the United States, residing at Washington, in the District of Columbia, have invented a new and Improved Apparatus for Aging Wines, Spirits, or other Liquors, of which the following is a specification.

In my application filed May 19, 1892, Serial No. 433,612, I have described and claimed an apparatus for aging liquors, consisting of an endless railway-track made with notched or recessed rails and springless trucks traveling thereon and carrying the liquor in bulk, so that by the tremulous agitation produced by passing over such uneven track the permeation of air through the body of liquor and the consequent oxidation of the fusel-oil may be facilitated and accelerated. I have also discovered that an effective agitation may be produced through the body of the liquor by means of springless trucks, upon which the liquor is carried in barrels, traveling upon an endless track made with smooth rails, and I have also discovered that the effect of the tremulous agitation thus produced is increased by a high temperature, and, furthermore, by alternating temperatures.

My present invention therefore consists in the combination of an endless track of smooth rails with springless trucks traveling thereon, carrying the liquor to be treated, and suitable machinery for propelling the cars on the tracks or propelling the tracks beneath the trucks.

My invention also consists in the combination of an endless track, springless trucks traveling thereon, means for propelling the trucks upon the track, or vice versa, and means for producing increased or alternating temperature, substantially as hereinafter described.

In the accompanying drawings, Figure I is a perspective view of an endless track carrying springless trucks traveling thereon, illustrating the invention. Fig. II is a sectional elevation of the same within a suitable building, showing, also, appliances for heating and cooling. Fig. III is a plan, with a part broken away, of a modification of the apparatus constructed with a continuously-driven turn-table and cars supported thereon; and Fig. IV is a section thereof.

1 represents a railway-track of circular, elliptic, or other suitable endless form, supported on a solid foundation 2 and inclosed in a suitable building 3.

4 represents springless trucks adapted to run continuously upon the endless track 1 and carrying barrels 5 or containing-vessels of any sort, which are partially filled with the liquor to be treated and loaded upon the trucks 4 by means of suitable cradles 6 and stakes 7 or other usual means.

For driving the trucks I prefer to employ an endless wire cable 9, engaging by friction in a grooved seat 10 prepared for it on the outer side of the truck-frames, so that the said trucks 4 constitute in effect sections of a spokeless pulley. The trucks forming the sections of such pulley require no coupling and do not need to be in contact or to form a complete pulley-rim. Any smaller number of trucks will be effectually driven by the cable, and it is not necessary that all of the trucks should be provided with cable-seats 10. Any trucks not so provided will be propelled around the track by the contact of the driven trucks behind them. The cars are conducted to and from the endless track by means of a switch 11, located within the bight of the cable 9, where it passes from the endless track to the driving machinery. I have shown the cable carried over guide-sheaves 12 12$^a$ and 13 13$^a$ to and from driving mechanism consisting of a grooved driving-drum 14, an engine 15, pitman 16, crank 17, fly-wheel 18, pinion 19, and cogged rim 20. The cable is carried in customary manner around a grooved tightening-drum 21, which runs in bearings in a sliding frame mounted on an inclined way 23 and drawn in opposition to the strain of the cable by a short cable 24, passing over a pulley 25 and provided with a weight 26 in order to maintain the requisite tension in the cable 9. Suitable grooved and cone-shaped sheaves 26 are arranged around the endless track to support and guide the cable 9 in its circuit at points where it is not carried by the trucks. The guide-sheave 13$^a$, from which the cable 9 passes out from the cable-driving mechanism to the endless track, is mounted at the proper height to deliver and guide the cable within reach of suitable catching arms or horns 27, which project downward and outward in the cable-seats 10 on the truck-frames, so that each cable-seat 10 on the truck-frames will properly engage the cable as it passes from the switch 11 to the endless track or as it is carried across the bight of the cable by pressure of the cars behind it in the continuous movement of the trucks around the endless track.

It is found that the oxidation of the fusel-oil in spirits is accelerated by raising the temperature to 100° or even 120° Fahrenheit, and, furthermore, that it is accelerated by alternating temperatures, the temperature being alternately raised to 100° or 120° and reduced to 40° or 30°, or even less. I have accordingly devised, in connection with my agitating apparatus, heating and cooling appliances consisting of a steam-coil 28, connected with the boiler 29 and controlled in customary manner by globe-valves 30 31, and I also employ a cooling-coil 32, connected with an ammonia or other well-known cooling device 33. The changes in temperature will be very quickly communicated to the atmosphere of the warehouse in which the operation is carried on and more gradually to the liquor contained in the barrels 5. For more rapid operations I employ flat or shallow tanks 34, of metal, having covers 35 to protect the liquor, but provided with vents 36, giving free access of the air to the surface of the liquor. By reason of the extended surface the free exposure to the air and the rapid transmission of heat in the flat metallic tanks 34, carried by trucks 4, as shown and described, the change produced by this apparatus is very rapid.

As a mechanical equivalent of the endless track 1 and trucks 4, driven continuously thereon by suitable machinery, I have shown in Fig. III the endless track $1^a$, mounted on a turn-table $1^b$, which is driven by gearing $9^a$ beneath the wheels of the trucks 4, said trucks being held stationary by an abutment 37, against which they are carried by the movement of the turn-table when first run thereon. This produces the same effect as the movement of the trucks on a fixed track. The cars may remain constantly on the track, being loaded and unloaded as occasion requires.

The entire structure constitutes a warehouse for the storage of liquor for an indefinite period, and while thus in store it undergoes the rapid aging process, as described.

Having thus described my invention, the following is what I claim as new and desire to secure by Letters Patent:

1. An apparatus for aging wines, spirits, and other liquors, consisting of a smooth endless railway-track, trucks running thereon and carrying the liquor to be treated, and driving mechanism for producing relative movement between the trucks and said railway-track, as herein shown and described.

2. The combination of a railway-track, trucks adapted to run thereon and carry the liquor under treatment, suitable driving mechanism for imparting sustained relative movement between said trucks and track, and heating apparatus 28 and cooling apparatus 33 for producing rapid changes of temperature in the liquor during treatment, as explained.

THEODORE R. TIMBY.

Witnesses:
OCTAVIUS KNIGHT,
WM. E. KNIGHT.